Oct. 24, 1933. W. LAUDER 1,932,279
APPARATUS FOR FOREPOLING
Filed Nov. 15, 1930 6 Sheets-Sheet 4

INVENTOR
William Lauder
By Green & McCallister,
His Attorneys

Oct. 24, 1933.  W. LAUDER  1,932,279
APPARATUS FOR FOREPOLING
Filed Nov. 15, 1930  6 Sheets-Sheet 5

INVENTOR
William Lauder
By Green & McCallister
His Attorneys

Oct. 24, 1933.   W. LAUDER   1,932,279
APPARATUS FOR FOREPOLING
Filed Nov. 15, 1930   6 Sheets-Sheet 6
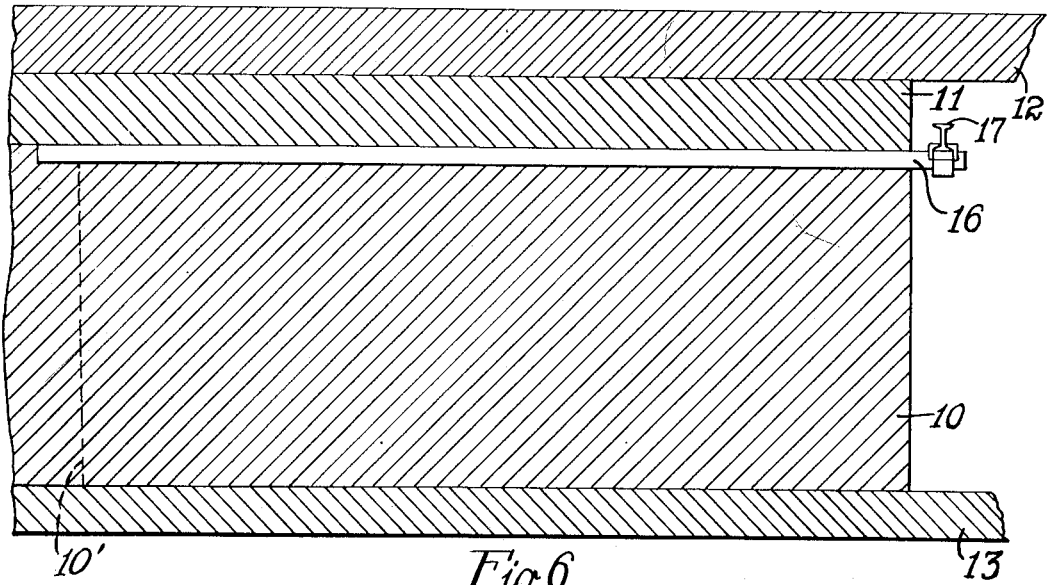
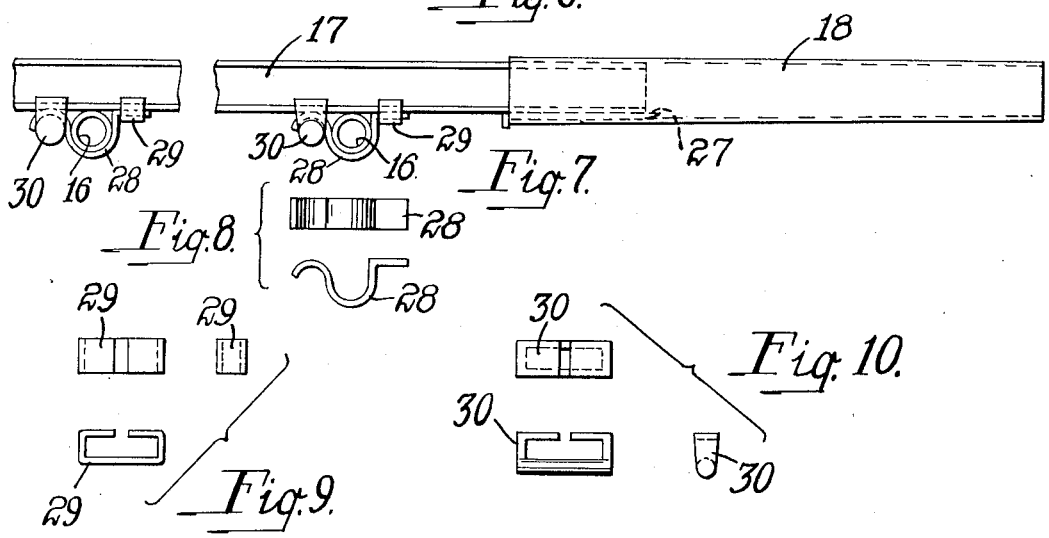
INVENTOR
William Lauder
By Green & McCallister
His Attorneys Patented Oct. 24, 1933

1,932,279

UNITED STATES PATENT OFFICE 1,932,279

APPARATUS FOR FOREPOLING

William Lauder, Elizabeth, Pa., assignor to Pittsburgh Coal Company, a corporation of Pennsylvania Application November 15, 1930
Serial No. 495,881

2 Claims. (Cl. 262—1)

This invention relates generally to mining apparatus and more specifically to apparatus for forepoling in connection with mining operations.

In a majority of mines as the mining operations progress along a bed of mineral such as coal, for example, to be mined, it is customary to erect various supporting means for the roof and/or the stratum of material immediately overlying the bed of coal or the like and which is in a typical case, a layer of draw slate. When the overlying stratum is not hard or firm the supports have been spaced irregularly as roof conditions may require, and as a result the mineral has to be mined practically entirely or very substantially by hand methods, it being impracticable to use loading machinery except to a limited degree in some mines. This not only slows up the removal of the coal, but has a tendency to add to the cost thereof and results also in an increase of the number of accidents in such mines due to unsafe or insecure procedure or supports.

One of the objects of my invention is to carry out mining operations, coal mining, for example, without interfering with standard practice in undercutting, shearing, drilling and shooting the mineral and in a generally safe and economical manner.

Another object is so to support certain elements in the tunnels, drifts, and mine entries that loading machinery of comparatively great size and capacity can be easily and effectively utilized with the consequent very substantial replacement of machinery for hand labor.

Another object of the invention is to provide a fore-poling structure of a highly effective yet simple form permitting the removal of mineral, coal, for example, relatively unmixed with other matter and which can be used in entries, room, pillars and long faces.

A further object is to erect a forepoling structure to maintain the stratum of material immediately overlying the bed of material to be mined from coming, during the mining operations, into admixture with the material mined. This layer will be hereinafter termed the superstratum.

A still further object is to support the superstratum while the mineral to be mined thereabove is removed and then to remove an amount of the superstratum substantially coextensive with the portion of subjacent mineral removed.

Other and further objects will be apparent to those skilled in this particular field or will be clear hereinafter.

The method of mining involves broadly the formation of forepoling holes in the top of the coal or other mineral to be mined and immediately below the superstratum. Poles, pipes, rods, bars, beams or the like are placed in these holes and the forepoling structure then completed in such a manner as to permit the free movement of mechanical loading devices, whereupon the underlying mineral is removed and thereafter temporary supports for the superstratum are set up and the forepoling structure withdrawn. Finally the temporary supports are knocked out and the superstratum removed to an extent substantially coextensive with the coal mined.

In the accompanying drawings, I have illustrated the use of the forepoling of the present invention and in these drawings:

Fig. 6 is a fragmentary vertical cross sectional view through a portion of the bed of mineral showing a modified form of forepoling structure associated therewith.

Fig. 7 is a front elevational view of the forepoling structure of Fig. 6.

Figs. 8, 9 and 10 are details of clamps which may be used.

Similar numerals refer to similar parts throughout the several views.

Figure 1:
Fig. 1 represents a perspective view of a set-up forepoling structure.

The bed of coal or other mineral to be mined is indicated by the numeral 10 and in a typical mine, for example, the superstratum consists of a layer of draw slate 11 above which is the roof of the working 12 and below the bed of material 10 is the bottom or flooring 13. The coal bed may average about 6 feet and the draw slate about one foot.

The coal is first undercut at 14 in the conventional manner and this may be done either by machine as is the present practice, or by hand, if necessary. A plurality of forepoling holes 15 are then suitably drilled into the bed of material perpendicular to the face thereof and immediately below the superstratum. These holes may be, for example 3" in diameter and extend further inward than the predetermined amount of mineral to be mined. For example, if about eight feet of mineral are to be removed the holes are drilled to a depth of about nine feet and the coal is undercut to a depth of about eight feet. Into these forepoling holes 15 are placed the forepoling poles, pipes, rods, bars, beams or the like of suitable strength or other members 16, and, in the instance illustrated, these pipes are about ten feet long so that they project about one-foot from the face of the bed, the other end, therefore, resting in the solid mineral in back of the mineral which is to be removed by the subsequent operations. (See dotted line 10' in Fig. 6 indicating depth of mineral to be removed.)

Figure 2:
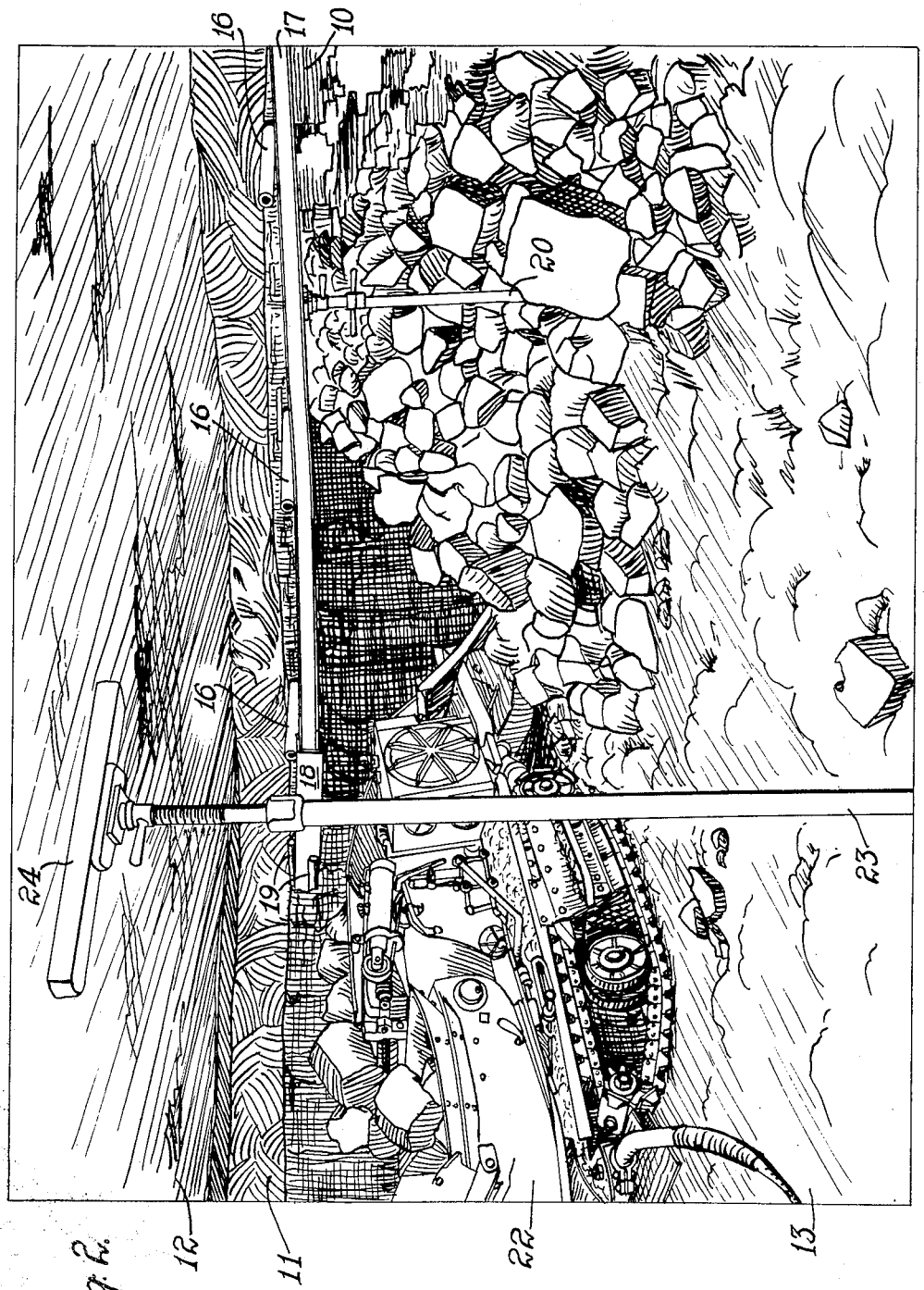
Fig. 2 is a perspective view of the coal or other mineral to be mined being removed by means of loading machinery.
Figure 3:
Fig. 3 is a perspective view of the face of the bed of mineral to be mined after the predetermined amount thereof has been completely removed.

After each hole has received its member, and there may be any suitable number of holes and members depending upon the various conditions in the mine, room, entry, pillar, or long face, the supporting H-beam 17, of suitable size for example, 4-inch, is then placed in position immediately beneath said pipes as clearly shown in Figs. 1, 2 and 3. This H-beam is of suitable strength and about 20' long and is provided at one end with an extension sleeve 18 which is provided for the purpose of adjusting the length of the beam to fit snugly against the walls or ribs of the bed and in a typical case, for example, the "room" to be cut is about twenty-one feet wide or more. The beam is then suitably wedged at each end by driving wedges 19 to hold the beam securely against the ribs, walls or roof as the case may be, one end of the beam resting in a hitch cut in the rib of the coal. Jacks 20 and 21 of suitable types are then suitably positioned, as shown in Fig. 1, at one side of the room under the beam end leaving at the other side a relatively wide space for mining the mineral. This mineral is blasted or knocked down in any suitable way and a loading machine 22, as is clearly shown in Fig. 2, of a suitable type is brought in to load the coal quickly with a minimum of manual effort and personal hazard. The particular form of loading machine forms no part of the present invention but the type shown in Fig. 2 may be utilized to great advantage.

As is shown in Fig. 2, the roof of the workings may be suitably supported by jack 23 and cap 24, and such forms no part of the present invention.

After the machine of Fig. 2 has loaded the coal from the lefthand side of the room, the jack 20 may be transferred to the lefthand side of the room to support the H-beam and jacks placed under the draw slate between the pipes to permit scraping of the coal not loaded by the machine, as shown in Fig. 3 and the righthand portion of the material then removed similarly to Fig. 2, the illustration in Fig. 3 showing such material already removed and in fact the predetermined amount of coal entirely removed. Wedges or blocks 20a may be used with the jacks to prevent sagging of the slate if required or found desirable.

Figure 4:
Fig. 4 illustrates an elevational view looking at the bed of mineral and illustrating the appearance of the workings when the temporary supports have been set up and the forepoling structure removed.

When the condition of Fig. 3 has been reached, temporary supports are placed in position under the superstratum 11 as shown clearly in Fig. 4, the superstratum having already settled from the roof as at 11a so that its weight rests on the pipes, poles, beams and jacks. This temporary supporting means may consist, for example, of appropriate uprights 25 having short cap pieces 26, the uprights being wedged thereunder so as to support the full weight of the superstratum from under which the mineral has been removed. The forepoling structure is then entirely removed.

Figure 5:
Fig. 5 represents the conditions in the workings immediately after the knocking out of the temporary supports of Fig. 4.

The next step is for the temporary supports to be knocked out and this may be done in any suitable manner such as by ropes, chains, post-pullers or long handled axes or the like, upon the removal of which the superstratum falls by its own weight as shown clearly in Fig. 5. Generally the entire portion of superstratum does not fall, but any remaining pieces in the corners or the like may be readily knocked down. The fragments are removed and it is thus seen that they have been kept entirely separate throughout from the coal or material being mined, and hence there has been no admixture with the resultant production of an inferior material or one requiring subsequent separation of the adulterating components.

Thereafter the whole process is repeated seriatim and this serial procedure may proceed the full length of the bed or any desired portion thereof until the desired or available amount of material has been mined.

I have found that by the use of the instant method, I not only accelerate the mining operations, but I produce a cleaner and more desirable mineral at a decreased cost per unit. This method is also adaptable to mines of many formations geologically, and to the driving of entries, drifts and tunnels in loose material, and I have found that in the instance illustrated the method is exceedingly adaptable and effective. The forepoling structure, as above indicated, does not interfere with standard practice of undercutting, shearing, drilling and shooting the mineral whereby the full benefits and advantages of the invention are secured without any concomitant disadvantages. The forepoiling structure, moreover, may be used equally well in entries, rooms and long faces, and where the room is very big, for example, a plurality of forepoiling structures may be set up alongside each other as will be understood from the foregoing. While the beam may be made of a suitable steel or alloy composition I find that an aluminum beam is light and strong and readily adaptable to my invention.

Whichever form is used, the forepoling structure is so erected that there may be free unrestricted and safe movement and use of mechanical loading devices to secure rapid, safe and economical loading of the mineral.

In some cases I find it more effective and advantageous to complete the forepoling structure above members 16 rather than below them and this form of the invention is illustrated in Figs. 6, 7, 8, 9 and 10. The holes for members 16 are bored immediately below the slate at the extreme top of the mineral. The beam 17 is placed on top of the member 16 and the hitch cut in which one end of the beam rests, as hereinabove described, is cut in the slate instead of in the mineral. Sleeve 18 of member 17 may be held in adjusted position as by wedge 27. Hangers 28 are placed in the position clearly shown in Fig. 7 and the elements secured appropriately by clamps 29 and 30, shaped as shown, and assembled as shown. This is so clearly shown as to require no further discussion, the clamps of course cooperating with the flanges of beam 17.

It is apparent that I need not necessarily form said holes 15 as a separate step or operation, but that they may be automatically or simultaneously formed with the entry of poles 16 by driving the same, suitably shaped therefor, if preferred, into the portion of mineral 10 in the positions indicated hereinabove. In other words, the poles 16 may be forcibly inserted, particularly when the mineral vein 10 is relatively soft and/or relatively pure.

Naturally I do not limit myself to precisely the details shown, but I reserve the right to such modifications, variations, substitutions and additions in the method as will enable it to be utilized in workings of comparable geologic formations.

What I claim as new and desire to secure by Letters Patent is:

1. A forepoling structure for use in supporting layers of material overlying mineral to be mined and which is advanced to enable mining of successive portions of mineral in a manner to provide for free, unrestricted and safe movement and use of mechanical loading devices during the mining operations, comprising poles perpendicular to the portion of mineral to be mined and extending into said mineral just below said overlying layers of material a distance greater than the depth of mineral about to be removed, said poles projecting from said mineral, a transverse supporting beam, having its ends snugly fitting against the adjacent walls, under said projecting pole portions, and means for supporting said beam and hence said overlying layers of material while said mineral is being mined, said beam having an extension sleeve to adapt the beam for variously spaced walls.

2. A forepoling structure for use in supporting layers of material overlying mineral to be mined and which is advanced to enable mining of successive portions of mineral in a manner to provide for free, unrestricted and safe movement and use of mechanical loading devices during the mining operations, comprising poles perpendicular to the portion of mineral to be mined and extending into said mineral just below said overlying layers of material a distance greater than the depth of mineral about to be removed, said poles projecting from said mineral, a transverse supporting beam, having its ends snugly fitting against the adjacent walls, under said projecting pole portions, and means for supporting said beam and hence said overlying layers of material while said mineral is being mined, said beam being variable in length to enable it to be used for differently spaced walls.

WILLIAM LAUDER.